United States Patent
Clyde et al.

(10) Patent No.: US 8,112,633 B1
(45) Date of Patent: Feb. 7, 2012

(54) SERVER SIDE VERIFICATION OF DIGITAL SIGNATURES IN STREAMING ENVIRONMENTS

(75) Inventors: Robert Allan Clyde, Pleasant Grove, UT (US); Timothy G. Brown, Fort Edward, NY (US); Brian Hernacki, Mountain View, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 891 days.

(21) Appl. No.: 12/164,983

(22) Filed: Jun. 30, 2008

(51) Int. Cl.
G06F 11/30 (2006.01)
(52) U.S. Cl. .................................. 713/187; 713/176
(58) Field of Classification Search .................. 713/165, 713/176, 179, 180, 181, 187, 189, 193; 726/26, 726/27
See application file for complete search history.

(56) References Cited

U.S. PATENT DOCUMENTS

| | | | |
|---|---|---|---|
| 6,263,442 B1 * | 7/2001 | Mueller et al. | 726/3 |
| 6,463,535 B1 * | 10/2002 | Drews | 713/176 |
| 7,596,694 B1 * | 9/2009 | Karp et al. | 713/164 |
| 7,797,544 B2 * | 9/2010 | Dillaway et al. | 713/179 |
| 2002/0144140 A1 * | 10/2002 | Ellison et al. | 713/200 |
| 2005/0120219 A1 * | 6/2005 | Munetoh et al. | 713/176 |
| 2008/0098230 A1 * | 4/2008 | Kalibjian et al. | 713/176 |
| 2009/0158043 A1 * | 6/2009 | Boyer et al. | 713/176 |

* cited by examiner

*Primary Examiner* — Beemnet Dada
(74) *Attorney, Agent, or Firm* — Brill Law Office; Jeffrey Brill

(57) ABSTRACT

When an executable file cannot be run on a client computer until the digital signature has been verified, the streaming server performs the verification if the entire file is not present on the client. More specifically, the client detects requests to verify digital signatures on executable files before allowing them to run. The client determines whether the entire executable file is present, and whether the server is trusted to verify digital signatures. If the entire file is not present locally and the server is trusted, the request to verify the digital signature is passed to the server. The server verifies the digital signature on its complete copy of the executable file, and returns the result to the client.

16 Claims, 3 Drawing Sheets

SERVER SIDE VERIFICATION OF DIGITAL SIGNATURES IN STREAMING ENVIRONMENTS

TECHNICAL FIELD

This invention pertains generally to application streaming, and more specifically enabling protection technologies that verify digital signatures to work in an application streaming environment.

BACKGROUND

Application streaming provides the ability for an endpoint (e.g., a client computer) to run an application locally that is stored remotely, for example on a server. The server transmits specific portions of the application (e.g., code pages) to the endpoint, as the endpoint needs them. Application streaming offers a number of advantages over running the application on the server. Streaming the application allows the application to execute locally on the endpoint, instead of remotely on the server. This eliminates the need for large farms of servers to provide applications to a plurality of client computers. Application response time to the user is also significantly faster when the application is run locally on the endpoint, as opposed to remotely on the server. Commercial application streaming technology exists today.

A network file system is a computer file system that supports sharing of resources such as files, printers and/or persistent storage over a computer network. Network file systems such as Andrew File System (AFS), NetWare Core Protocol (NCP), and Server Message Block (SMB, also known as Common Internet File System (CIFS)) exist today. Network file systems can share files, including executable files, between servers and endpoints.

Block-oriented application streaming technology and some network file systems stream only those blocks of an application that are required for execution of the features being used on the endpoint. In most cases, only a portion of the entire file is transferred to the client. This allows the desired features to be executed without the overhead of having to transfer the entire file to the client, but can cause problems for client side security systems.

More specifically, in some cases security systems verify a digital signature on an executable file before allowing it to run. This security check can be used to ensure that the file is from a trusted source, and/or has not been infected with malicious code or otherwise compromised. However, digital signature verification requires the entire file to be present. Thus, when only a portion of an executable file is present, the digital signature of the file cannot be verified and hence the executable cannot be run under such streaming technologies without first transferring the entire file to the client. Transferring the entire file eliminates the efficiency gain that can be provided by the streaming service.

It would be desirable to eliminate these shortcomings.

SUMMARY

When an executable file cannot be run on a client computer until the digital signature has been verified, the streaming server performs the verification if the entire file is not present on the client. More specifically, the client detects requests to verify digital signatures on executable files before allowing them to run. The client determines whether the entire executable file is present, and whether the server is trusted to verify digital signatures. If the entire file is not present locally and the server is trusted, the request to verify the digital signature is passed to the server. The server verifies the digital signature on its complete copy of the executable file, and returns the result to the client.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
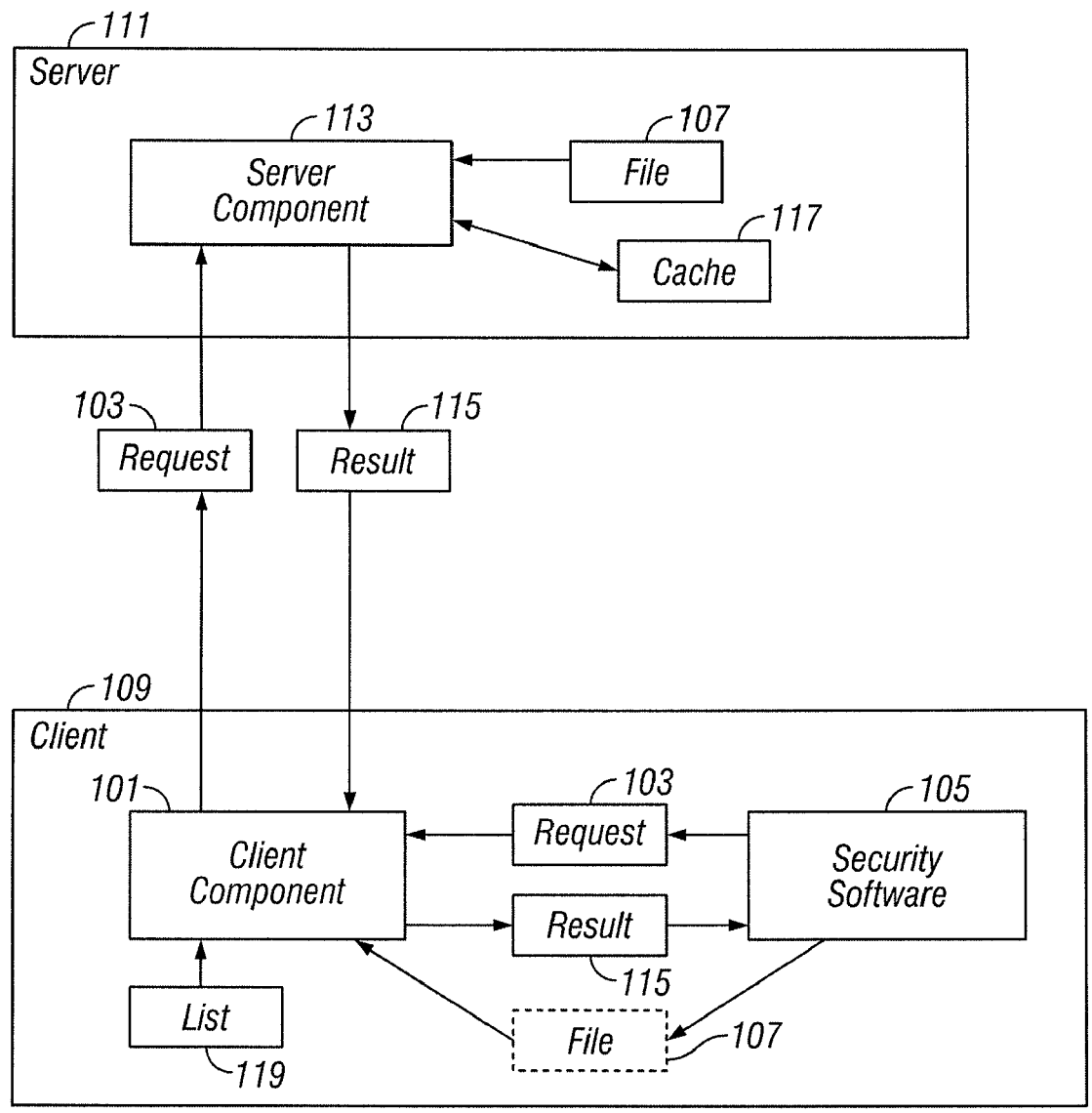
FIG. 1 is a block diagram illustrating a system for allowing digital signature verification and local execution of a streamed application file, without requiring that the entire file be transferred, according to some embodiments of the present invention.

FIG. 1 illustrates a system for allowing digital signature verification and local execution of a streamed application file 107, without requiring that the entire file 107 be transferred to the client 109, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a client side component 101 running on the endpoint 109 (a local computer) intercepts requests 103 for verifying digital signatures, and a server side component 113 running on the streaming server 111 can perform the requested verification. Such requests 103 are made by processes attempting to verify the digital signature on some electronic content. In the case at issue here, the requests 103 are made by security software 105 attempting to verify the digital signature on an executable file 107 before allowing it to run. In one embodiment, the client component 101 intercepts the requests 103 by hooking system calls 103 associated with verification of digital signatures provided by the operating system (many operating systems provide such a service). In some embodiments, if an intercepted request 103 is not of interest to the client component 101 (e.g., a request 103 to verify a digital signature on an email as opposed to one on an executable file 107), the request 103 is simply passed to the system verification routine. On the other hand, if the request 103 is relevant (e.g., the request 103 is attempting to verify a digital signature on an executable file 107), the special processing described below is executed. In some embodiments, all requests 103 are processed as described below, without regard to the source or target of the request 103.

The specific implementation mechanics of intercepting digital signature verification requests 103 varies from operating system to operating system, and under some operating systems there is more than one way to achieve this result. For example, under Microsoft Windows®, the system digital signature functionality can be intercepted by hooking the Microsoft Cryptographic API (CAPI), or alternatively by providing a CAPI module. The specific protocols for intercepting system services under various operating systems are known to those of ordinary skill in the relevant art, and the use of applying those techniques to intercept requests 103 to process digital signatures within the context of the present invention will be readily apparent to one of such a skill level in light of this specification.

The client component 101 examines intercepted requests 103 to verify digital signatures, and determines whether the entire corresponding binary file 107 is already on the local computer 109. If it is, the client component 101 returns control to the system digital signature routine, and the verification of the digital signature can proceed according to the standard processing. However, if the entire binary file 107 is not present locally and the streaming server 111 is trusted, the client component 101 can request that the server component 113 verify the digital signature on its behalf. In that case, the client component 101 passes the request 103 to the server component 113, which has access to the complete file 103 which is present on the server 111. The server component 113 performs the verification functionality (for example by making the appropriate system call), and returns the verification result 115 to the client component 101. The client component 101 then returns that relayed result 115 to the process that called the intercepted digital signature processing routine, which in this case is the security software 105. The security software 105 can then determine whether to allow the executable file 107 to run based on the result 115. Note that all of this functionality is transparent to the security software 105, which simply makes digital signature verification requests 103 and receives valid results 115, without any indication that the executable file 107 is not locally present or that the digital signature processing was not performed by the system routine. In another embodiment, the security software 105 works in coordination with the streaming software, as discussed below in conjunction with FIG. 3.

In some embodiments, the client component 101 always passes the request 103 to the server component 113 if the server 111 is trusted. However, to minimize load on the server 111, if the complete file 107 is present locally, it is beneficial to do the verification on the client 109 as described above, and thereby utilize the client's resources as opposed to those of the server 111. As a further improvement, the server component 113 can store the results 115 of the digital signature checks it performs in a cache 117, so as to minimize the number of full file 107 calculations it performs and thereby save computing resources.

It is to be understood that a "server" 111 can consist of a final destination server 111 or a local network streaming cache server 111 (not illustrated), as long as the cache server 111 provides the same content as the master server 111. Note that not all servers 111 are trusted. The client component 101 can be configured with a secured list 119 identifying trusted servers 111 and/or alternatively with a list 119 of un-trusted servers 111. These list(s) 119 can be updated in real time, for example through updating by a centralized security service (not illustrated). In other embodiments, the client component 101 can determine whether a given server 111 is trusted in other ways, for example by consulting a remote whitelist, or probing the server 111 using any of a variety of techniques. It is to be understood that the criteria on which servers 111 are adjudicated as being trusted or un-trusted are variable design parameters.

Before offloading a digital signature processing request 103 to the server component 113, the client component 101 determines whether the server 111 is trusted, as discussed above. If so, the client component 101 passes the verification to the server component 113. If the server 111 is not trusted, the entire file 107 must be transmitted from the server 111 so that the digital signature can be verified locally before the application is run. Thus, trusted servers 111 are given a large perceived performance boost over non-trusted servers 111, since they enable an application to execute before being received in its entirety, even where a digital signature check must be performed prior to the running of the application.

Figure 2:
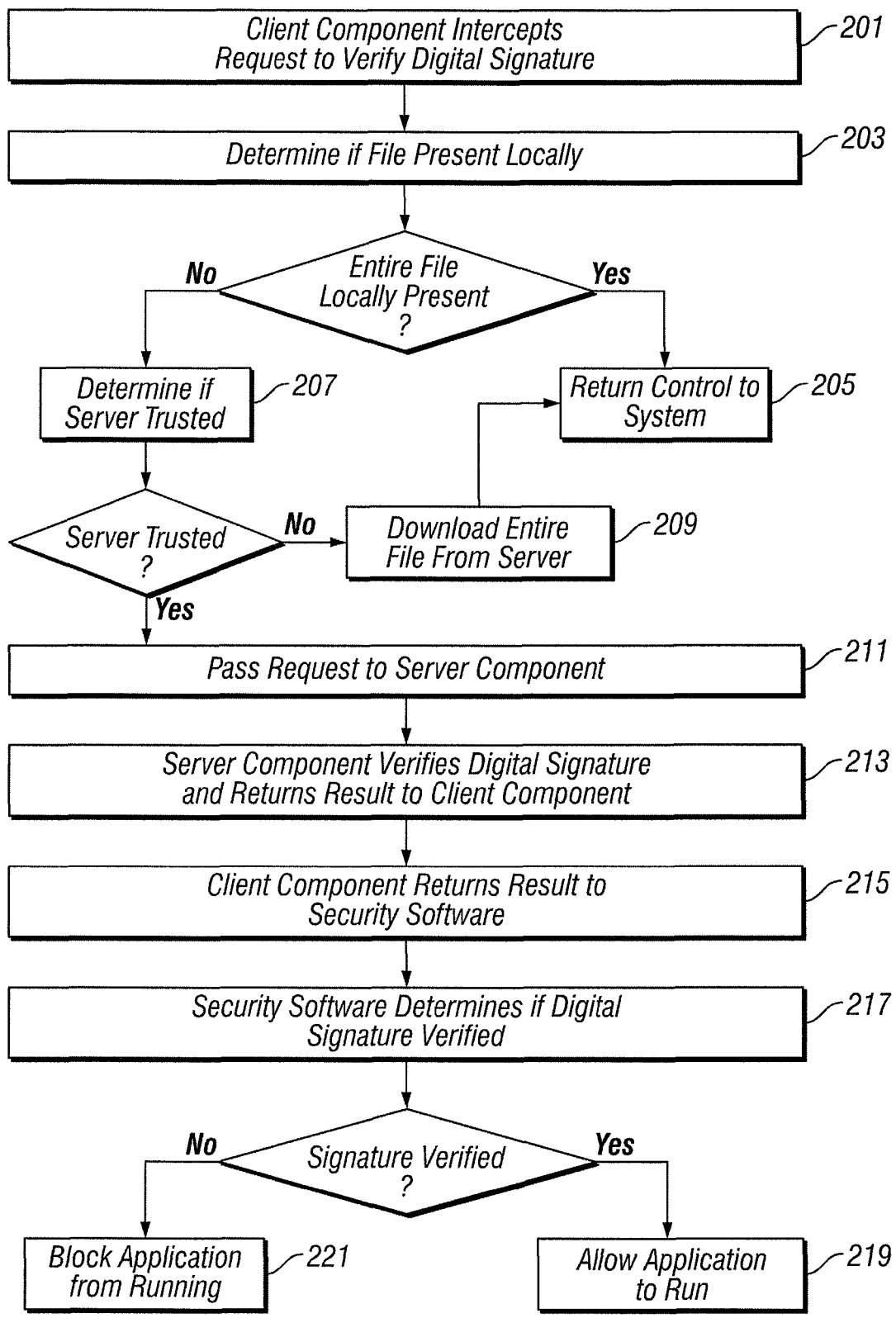
FIG. 2 is a flowchart illustrating steps for verifying a digital signature and locally executing a streamed application file, without the entire file being present, according to some embodiments of the present invention.

FIG. 2 is a flowchart illustrating steps for verifying a digital signature and locally executing a streamed application file 107, without the entire file 107 being present, according to some embodiments of the present invention. As illustrated in FIG. 2, the client component 101 intercepts 201 a request 103 made by security software 105 to verify the digital signature on an executable file 107. The client component 101 determines 203 whether the entire file 107 is present locally on the client computer 109. If so, the client component 101 returns 205 control to the system digital signature processing routine, which can execute standard digital signature verification. On the other hand, if the entire file 107 is not present on the client 109, the client component determines 207 whether the server 111 is trusted. If the server 111 is not trusted, the client component 101 downloads 209 the sections of the file 107 that are not present, and returns 205 control to the system digital signature processing routine to verify the digital signature. If the server 111 is trusted, the client component 101 passes 211 the request 103 to verify the digital signature to the server component 113, which runs on the server 111 and thus has access to the entire file 107.

The server component 113 performs 213 the digital signature verification functionality, and returns the result 115 to the client component 101. The client component 101 then returns 215 the result 115 to the security software 105 which made the request 103 originally. The security software 105 can then determine 217 whether or not to execute the application based on the result 115 of the digital signature verification. If the digital signature is valid, the security software 105 allows 219 the application to run. Otherwise, the security software 105 prevents 221 the execution of the application.

Figure 3:
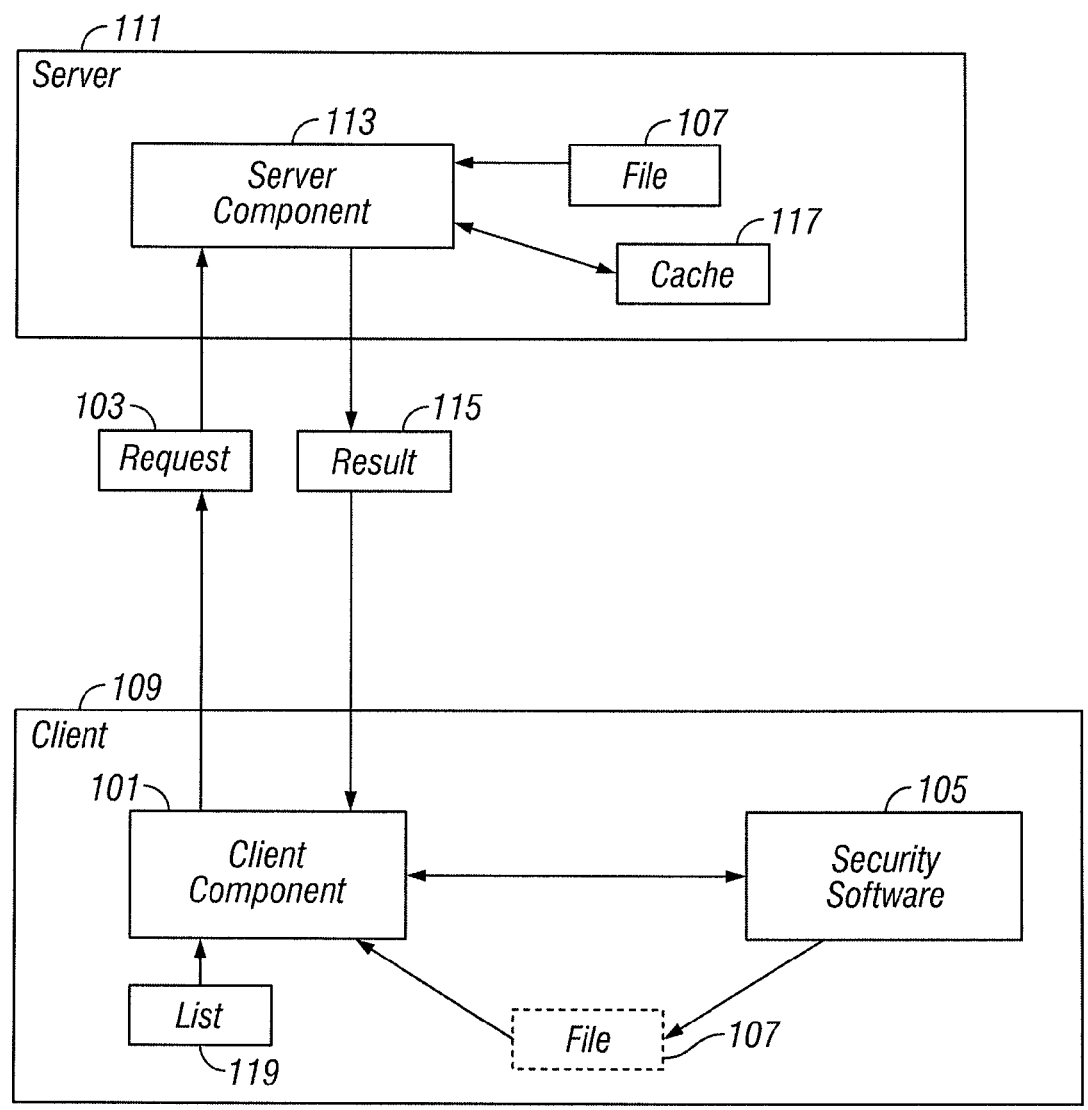
FIG. 3 is a block diagram illustrating a system in which security software and streaming software are integrated, according to some embodiments of the present invention.

FIG. 3 illustrates another embodiment of the present invention, in which the security software 105 works in conjunction with the streaming software (i.e., the client component 101 and the server component 113). In this embodiment, rather than the client component 101 intercepting requests 103 to verify digital signatures, the security software 105 calls the client component directly when it wishes to verify a digital signature on an executable file 107 to determine whether to allow it to run. Responsive to the call from the security software 105, the client component 101 determines whether the entire file 107 is locally present. If so, the client component 101 can initiate the verification of the digital signature on the local copy of the file 107 (e.g., by calling the appropriate system service and returning the result 115 to the security software 105, or by directing the security software 105 to process the verification). If the entire file 107 is not present, the client component 101 can interact with the server component 113 as discussed above in conjunction with FIG. 1.

In a variation on the embodiment illustrated in FIG. 3, the security software 105 can determine whether the entire executable file 107 is locally present, and then initiate the digital signature verification if so or interact with the server component 113 if not. These embodiments can be more efficient than those illustrated in FIG. 1, as the overhead of intercepting the digital signature functionality is eliminated. However, in the embodiments illustrated in FIG. 3, the security software 105 and streaming software are integrated, which may not be practicable or desirable under all circumstances.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A machine implemented method for verifying digital signatures on executable files in an application streaming environment, said environment comprising a server and at least one client in which the server streams at least portions of executable files to the at least one client for local execution, the method comprising the steps of:
   determining that a process local to a client is attempting to verify a digital signature on an executable file, prior to allowing the executable file to run;
   determining whether the server is trusted to verify the digital signature; and
   responsive to at least whether the server is trusted to verify the digital signature, performing one step from a group of steps consisting of: 1) responsive to determining at least that the server is trusted to verify the digital signature, transmitting a request to the server to verify the digital signature, and 2) responsive to determining at least that the server is not trusted to verify the digital signature, transmitting a request to the server to transmit the executable file to the client.

2. The method of claim 1 wherein determining that a process local to a client is attempting to verify a digital signature on an executable file further comprises:
   intercepting a request made by the process to verify the digital signature on the executable file.

3. The method of claim 1 wherein determining that a process local to a client is attempting to verify a digital signature on an executable file further comprises:
   receiving a request from the process to verify the digital signature on the executable file.

4. The method of claim 1 wherein determining whether the server is trusted to verify the digital signature further comprises performing at least one step from a group of steps consisting of:
   consulting a local list of trusted servers;
   consulting a local list of un-trusted servers;
   consulting a remote list of trusted servers;
   consulting a remote list of un-trusted servers; and
   probing the server.

5. The method of claim 1 further comprising:
   receiving a result from the server component concerning the request to verify the digital signature.

6. The method of claim 5 further comprising:
   responsive to the received result, performing an additional step from a group of steps consisting of: a) allowing the executable file to run locally on the client, and b) preventing the executable file from running locally on the client.

7. The method of claim 1 further comprising:
   determining whether the entire executable file is locally present on the client.

8. The method of claim 7 further comprising:
   responsive to determining that the server is trusted to verify the digital signature and that the entire executable file is not locally present on the client, transmitting a request to the server to verify the digital signature.

9. At least one non-transitory computer readable medium containing a computer program product for verifying digital signatures on executable files in an application streaming environment, said environment comprising a server and at least one client in which the server streams at least portions of executable files to the at least one client for local execution, the computer program product comprising:
   program code for determining that a process local to a client is attempting to verify a digital signature on an executable file, prior to allowing the executable file to run;
   program code for determining whether the server is trusted to verify the digital signature; and
   program code for, responsive to at least whether the server is trusted to verify the digital signature, performing one step from a group of steps consisting of: 1) responsive to determining at least that the server is trusted to verify the digital signature, transmitting a request to the server to verify the digital signature, and 2) responsive to determining at least that the server is not trusted to verify the digital signature, transmitting a request to the server to transmit the executable file to the client.

10. The computer program product of claim 9 wherein the program code for determining that a process local to a client is attempting to verify a digital signature on an executable file further comprises:

program code for intercepting a request made by the process to verify the digital signature on the executable file.

11. The computer program product of claim 9 wherein the program code for determining that a process local to a client is attempting to verify a digital signature on an executable file further comprises:

program code for receiving a request from the process to verify the digital signature on the executable file.

12. The computer program product of claim 9 wherein the program code for determining whether the server is trusted to verify the digital signature further comprises program code for performing at least one step from a group of steps consisting of:

consulting a local list of trusted servers;
consulting a local list of un-trusted servers;
consulting a remote list of trusted servers;
consulting a remote list of un-trusted servers; and
probing the server.

13. The computer program product of claim 9 further comprising:

program code for receiving a result from the server component concerning the request to verify the digital signature.

14. The computer program product of claim 13 further comprising:

program code for, responsive to the received result, performing an additional step from a group of steps consisting of: a) allowing the executable file to run locally on the client, and b) preventing the executable file from running locally on the client.

15. The computer program product of claim 9 further comprising:

program code for determining whether the entire executable file is locally present on the client.

16. The computer program product of claim 15 further comprising:

program code for, responsive to determining that the server is trusted to verify the digital signature and that the entire executable file is not locally present on the client, transmitting a request to the server to verify the digital signature.

* * * * *